United States Patent
Furukawa et al.

(10) Patent No.: US 6,303,681 B1
(45) Date of Patent: Oct. 16, 2001

(54) FLAME-RETARDANT POLYOLEFIN-TYPE RESIN COMPOSITION, METHOD FOR THE PREPARATION THEREOF, AND FLAME RETARDANT CABLES

(75) Inventors: Haruhiko Furukawa; Hidekatsu Hatanaka; Koji Shiromoto; Hiroshi Ueki; Koji Nakanishi; Yoshitsugu Morita, all of Chiba Perfecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/662,371

(22) Filed: Sep. 15, 2000

(30) Foreign Application Priority Data

Oct. 13, 1999 (JP) .................................................. 11-291177

(51) Int. Cl.$^7$ ...................................................... C08K 3/22
(52) U.S. Cl. ........................ 524/436; 524/437; 174/110 R
(58) Field of Search ................................... 524/436, 437; 174/110 R

(56) References Cited

U.S. PATENT DOCUMENTS

| | | | |
|---|---|---|---|
| 3,742,084 | 6/1973 | Olyphant, Jr. et al. | 260/827 |
| 3,865,897 | 2/1975 | Falender et al. | 260/827 |
| 3,979,356 | 9/1976 | Walters | 260/42.26 |
| 4,533,687 | * 8/1985 | Itoh et al. | 524/436 |
| 5,827,906 | * 10/1998 | Metzemacher et al. | 523/205 |

FOREIGN PATENT DOCUMENTS 05-339510    12/1993    (JP) .

\* cited by examiner

*Primary Examiner*—Veronica P. Hoke
(74) *Attorney, Agent, or Firm*—Alex Weitz; Alan Zombeck

(57) ABSTRACT

A flame-retardant polyolefin-type resin composition comprising
(A) 100 weight parts polyolefin-type resin,
(B) 30 to 200 weight parts powder of a hydrated metal compound, and
(C) 0.01 to 50 weight parts branched organopolysiloxane with average unit formula $$R_aSiO_{(4-a)/2}$$

where each R is a selected from the group consisting of monovalent organic groups selected from the group consisting of $C_1$ to $C_{12}$ alkyl and $C_6$ to $C_{12}$ aryl and hydroxyl, wherein aryl constitutes from 50 to 100 mole % of the total monovalent organic groups and the hydroxyl content in each molecule is from 1 to 10 weight %, a is a number from 0.75 to 2.5, and the organopolysiloxane contains at least one $RSiO_{3/2}$ siloxane unit in each molecule, where R is as previously described. The composition is useful as a flame-retardant coating on electrical cables.

15 Claims, No Drawings

FLAME-RETARDANT POLYOLEFIN-TYPE RESIN COMPOSITION, METHOD FOR THE PREPARATION THEREOF, AND FLAME RETARDANT CABLES

BACKGROUND OF INVENTION

This invention relates to a flame-retardant polyolefin-type resin composition, to a method for the preparation thereof, and to flame-retardant cables coated with the composition. More particularly, this invention relates to a highly flame-retardant, highly moldable flame-retardant polyolefin-type resin composition that exhibits excellent mechanical strength, to a method for the preparation of same, and to flame-retardant cables having a coating of the aforesaid flame-retardant polyolefin-type resin composition One method used to impart flame retardancy to polyolefin-type resins, e.g., polyethylene resins and ethylene-vinyl acetate copolymer resins, comprises blending polyolefin-type resin with a halogen-containing compound (chlorine is a typical example of the halogen). However, halogenated compound-loaded polyolefin-type resin compositions of this type, in addition to evolving large amounts of black smoke during burning, produce gases harmful to humans and corrosive to metals. The addition of the powder of a hydrated metal compound, such as aluminum hydroxide powder or magnesium hydroxide powder, to polyolefin-type resin has already been proposed in order to address the problems described above for halogenated compounds. Unfortunately, this approach has required the addition of large amounts of the hydrated metal compound powder in order to impart flame retardancy to the polyolefin-type resin, and this high loading requirement has prevented the production of anything other than flame-retardant polyolefin-type resins with poor moldabilities and diminished mechanical strength. Japanese Laid Open Patent Application Number Hei 5-339510 (339,510/1993) teaches the production of flame-retardant polyolefin-type resin compositions by the addition of alkoxy-functional branched organosiloxane resin, phosphate ester, and metal hydroxide to thermoplastic resins such as styrenic resins and polyolefin-type resins. One problem with this method is that it affords a flame-retardant polyolefin-type resin composition whose flame retardancy is not entirely satisfactory. Moreover, because it requires the use of phosphate ester, this method, for example, may be unacceptable depending on the particular application and, within the context of disposal, because of the concern of soil pollution by phosphorus compounds.

The inventors achieved this invention as a result of intensive investigations directed to solving the problems described above. In specific terms, an object of this invention is to provide a highly moldable and flame-retardant polyolefin-type resin composition. Additional objects of this invention are to provide a method for producing this flame-retardant polyolefin-type resin composition and to provide flame-retardant cables.

SUMMARY OF INVENTION

The present invention is a flame-retardant polyolefin-type resin composition comprising (A) 100 weight parts polyolefin-type resin, (B) 30 to 200 weight parts powder of a hydrated metal compound, and (C) 0.01 to 50 weight parts branched organopolysiloxane with average unit formula $$R_aSiO_{(4-a)/2}$$

where each R is a selected from the group consisting of monovalent organic groups selected from the group consisting of $C_1$ to $C_{12}$ alkyl and $C_6$ to $C_{12}$ aryl and hydroxyl, wherein aryl constitutes from 50 to 100 mole % of the total monovalent organic groups and the hydroxyl content in each molecule is from 1 to 10 weight %, a is a number from 0.75 to 2.5, and the organopolysiloxane contains at least one $RSiO_{3/2}$ siloxane unit in each molecule, where R is as previously described.

The invention additionally relates to a method for producing the flame-retardant polyolefin-type resin composition and to flame-retardant cables having a coating of the flame-retardant polyolefin-type resin composition.

DESCRIPTION OF INVENTION

The present invention is a flame-retardant polyolefin-type resin composition comprising (A) 100 weight parts polyolefin-type resin, (B) 30 to 200 weight parts powder of a hydrated metal compound, and (C) 0.01 to 50 weight parts branched organopolysiloxane with average unit formula $$R_aSiO_{(4-a)/2}$$

where each R is a selected from the group consisting of monovalent organic groups selected from the group consisting of $C_1$ to $C_{12}$ alkyl and $C_6$ to $C_{12}$ aryl and hydroxyl, wherein aryl constitutes from 50 to 100 mole % of the total monovalent organic groups and the hydroxyl content in each molecule is from 1 to 10 weight %, a is a number from 0.75 to 2.5, and the organopolysiloxane contains at least one $RSiO_{3/2}$ siloxane unit in each molecule, where R is as previously described.

The invention additionally relates to a method for producing the flame-retardant polyolefin-type resin composition and to flame-retardant cables having a coating of the flame-retardant polyolefin-type resin composition.

The polyolefin-type resin (A) used in this invention as a general matter encompasses those high molecular weight compounds known as polyolefin-type resins, that is, the high molecular weight polymers whose main backbone derives from ethylene-series hydrocarbon. Such features as the specific type and so forth are not critical. The polyolefin-type resin under consideration can be exemplified by polyethylenes such as high-density polyethylene, medium-density polyethylene, and low-density polyethylene; copolymers of ethylene with $C_3$ to $C_{12}$ α-olefin such as propylene, 1-butene, 1-pentene, 1-hexene, 4-methyl-1-pentene, 1-octene, and 1-decene; polypropylenes; copolymers of propylene with $C_2$ to $C_{12}$ α-olefin such as ethylene, 1-butene, 1-pentene, 1-hexene, 4-methyl-1-pentene, 1-octene, and 1 decene; ethylene-propylene copolymer rubbers; ethylene-propylene-iene copolymer rubbers; the copolymers of ethylene with vinylic monomer such as vinyl acetate, ethyl acrylate, methacrylic acid, ethyl methacrylate, maleic acid, and maleic anhydride; the copolymers afforded by the modification of polyethylene or an ethylene α-olefin copolymer with an unsaturated carboxylic acid, such as acrylic acid and maleic acid, or derivative of an unsaturated carboxylic acid; and mixtures of the preceding polyolefin-type resins. Preferred among these examples are the polyethylenes, ethylene-vinyl acetate copolymers, ethylene-ethyl acrylate copolymers, and copolymers of maleic acid or maleic anhydride with ethylene or α-olefin.

The hydrated metal compound powder (B) used in this invention is the essential component for imparting flame retardancy to the composition. Component (B) with a decomposition initiation temperature in the range of from 150 to 450° C. is preferred because such a component (B) has a high flame-retarding activity. Component (B) also preferably has an average particle size in the range from 0.01 to 30 μm for the good dispersibility in polyolefin-type resins this affords. An average particle size in the range from 0.05 to 10 μm is even more preferred. Component (B) can be exemplified by magnesium hydroxide powder, aluminum hydroxide powder, and these powders after surface treatment with a surface treatment agent such as a silane coupling agent, titanium coupling agent, or higher aliphatic acid. Magnesium hydroxide is the preferred selection from among the preceding.

Component (B) should be introduced into the present composition at from 30 to 200 weight parts per 100 weight parts component (A) and is preferably introduced at from 50 to 150 weight parts per 100 weight parts component (A). An inability to impart a desirable flame retardancy to the polyolefin-type resin composition can occur when the addition of component (B) falls below 30 weight parts, while additions in excess of 200 weight parts cause the polyolefin-type resin composition to have a reduced mechanical strength.

The branched organopolysiloxane (C) used in the present composition is the component that characterizes this invention. Component (C) functions, in its co-use with component (B), to improve the flame retardancy of the composition of this invention. Component (C) also functions to improve the moldability of the present composition. Component (C) is branched organopolysiloxane with the average unit formula $R_aSiO_{(4-a)/2}$ that contains at least one $RSiO_{3/2}$ siloxane unit in each molecule. R in $R_aSiO_{(4-a)/2}$ and $RSiO_{3/2}$ is selected from the group consisting of monovalent organic groups selected from the group consisting of $C_1$ to $C_{12}$ alkyl and $C_6$ to $C_{12}$ aryl and hydroxyl group. The $C_1$ to $C_{12}$ alkyl encompassed by R can be exemplified by methyl, ethyl, n-propyl, isopropyl, butyl, and hexyl; while the $C_6$ to $C_{12}$ aryl can be exemplified by phenyl, naphthyl, and tolyl. Aryl should constitute from 50 to 100 mole % of the total monovalent organic groups in component (C) and the hydroxyl content in each molecule should be from 1 to 10 weight %. The subscript a in formula $R_aSiO_{(4-a)/2}$ is a number from 0.75 to 2.5. Propyl and phenyl are preferred for the R group in the aforementioned formulas.

It is essential that aryl constitute from 50 to 100 mole % of the total monovalent organic groups in component (C). This value is preferably from 50 to 99 mole % and is more preferably from 60 to 90 mole %. An aryl content below 50 mole % results in a reduced flame retardancy for the present composition.

Each molecule of component (C) must contain from 1 to 10 weight % hydroxyl and preferably contains from 2 to 8 weight % hydroxyl. The present composition will suffer from a reduced flame retardancy at a hydroxyl content below 1 weight % or in excess of 10 weight %.

Component (C) must contain at least one siloxane unit with the formula $RSiO_{3/2}$ (T unit) in each molecule, where R is as defined above. In addition to the T unit, component (C) may also contain siloxane units with the formula $R_3SiO_{1/2}$ (M unit, R is defined as above), siloxane units with the formula $R_2SiO_{2/2}$ (D unit, R is defined as above), and siloxane units with the formula $SiO_{4/2}$ (Q unit). When these other units are present, the T unit content is preferably at least 90 mole % and more preferably is at least 95 mole %.

With regard to the presence of the D unit in component (C), the D unit: T unit molar ratio is preferably in the range from 0:100 to 10:90 and more preferably is from 0:99 to 5:95.

Branched organopolysiloxane with the following average molecular formula is preferred for component (C)

$$(R^1_3SiO_{1/2})_a(R^1_2SiO_{2/2})_b(R^1SiO_{3/2})_c(SiO_{4/2})_d(HO_{1/2})_e$$

where R is a monovalent hydrocarbon group selected from the group consisting of $C_1$ to $C_{12}$ alkyl and $C_6$ to $C_{12}$ aryl, a is zero or a positive number, b is zero or a positive number, c is a positive number, d is 0 or a positive number, and e is a positive number.

The $C_1$ to $C_{12}$ alkyl encompassed by $R^1$ can be exemplified by methyl, ethyl, n-propyl, isopropyl, butyl, and hexyl; while the $C_6$ to $C_{12}$ aryl can be exemplified by phenyl, naphthyl, and tolyl.

The softening point of component (C) is preferably lower than the softening point of the polyolefin-type resin (A) and more preferably is no greater than 300° C. When component (A) is a polyolefin-type resin with a relatively low softening point, component (C) preferably has a softening point no greater than 200° C. and more preferably is a solid at room temperature.

The weight-average molecular weight of component (C) should as a general matter be 300 to 500,000 and preferably is 300 to 100,000 and more preferably is 300 to 10,000. As used herein, the weight-average molecular weight is the value measured by gel permeation chromatography (GPC).

The component (C) content of the present composition should be from 0.01 to 50 weight parts and preferably is from 0.1 to 30 weight parts, in each case per 100 weight parts component (A). Little capacity to impart flame retardancy is manifested at a content of component (C) below 0.01 weight part, while the mechanical strength is diminished at a content in excess of 50 weight parts.

The present composition comprises components (A), (B), and (C), but in addition may contain insofar as the objects of this invention are not impaired the various additives known for improving the properties of polyolefin-type resins. These additives can be exemplified by inorganic fillers such as calcium carbonate, calcium silicate, potassium titanate, talc, clay, mica, and silica; oxidation inhibitors; lubricants; pigments; ultraviolet absorbers; heat stabilizers; light resistance improvers; dispersants; and static inhibitors.

The present composition can be made by simply mixing components (A), (B), and (C) together to homogeneity. In order to improve the dispersion of component (C) in component (A), in a preferred method components (A) and (B) are first mixed with each other while heating at a temperature greater than or equal to the softening point of component (A) and component (C) is then admixed with heating.

As stated above, the present resin composition can be made simply by mixing components (A), (B), and (C) to homogeneity. The means for effecting this component mixing can be exemplified by mixing apparatuses and compounding apparatuses such as 2-roll mills, Banbury mixers, and kneader mixers.

Because of its excellent moldability, the present composition can be easily processed into film, sheet, board, and pipe moldings by such conventional plastic molding techniques as extrusion molding, calender molding, and injection molding. The moldings thus obtained are characterized by an excellent flame retardancy and also by an excellent mechanical strength and therefore can be used in those applications where such properties are critical. Among such applications, the present composition is highly suited for application to cables such as electric power cables, optical fiber cables, and communication cables.

The invention is explained in greater detail below through working examples. The viscosity values reported in the examples were measured at 25° C., while parts in the examples denotes weight parts. The flame retardancy of the flame-retardant polyolefin-type resins was evaluated by measurement of the oxygen index based on JIS K 7201, "Plastics—Determination of Burning Behavior by the Oxygen Index". The mechanical strength was evaluated by measurement of the tensile strength based on JIS K 7113, "Testing Method for the Tensile Properties of Plastics".

The branched organopolysiloxanes used in the examples had the average molecular formulas reported below in Table 1 and the properties reported below in Table 2. The following abbreviations are used in the examples: Me for methyl, Pr for n-propyl, Ph for phenyl, D for the $Me_2SiO_{2/2}$ unit, T for the $MeSiO_{3/2}$ unit, $T^{Pr}$ for the $PrSiO_{3/2}$ unit, and $T^{Ph}$ for the $PhSiO_{3/2}$ unit. The molecular structure of the branched organopolysiloxanes was analyzed using nuclear magnetic resonance spectroscopy (NMR). The weight-average molecular weight was measured by GPC. The weight-average molecular weight is the value calculated on the basis of known polystyrene standards.

TABLE 1

| branched organo-polysiloxane | average unit formula | average molecular formula |
| --- | --- | --- |
| SR1 | $Pr_{0.30}P_{0.70}(HO)_{0.43}SiO_{1.29}$ | $T^{Pr}_{0.30}T^{Ph}_{0.70}(HO_{1/2})_{0.43}$ |
| SR2 | $Me_{1.00}(MeO)_{0.90}SiO_{1.05}$ | $T_{1.00}(MeO_{1/2})_{0.90}$ |
| SR3 | $Me_{1.67}(MeO)_{0.56}SiO_{0.89}$ | $D_{0.67}T_{0.33}(MeO_{1/2})_{0.56}$ |
| SR4 | $Me_{1.14}(HO)_{0.05}SiO_{1.41}$ | $D_{0.14}T_{0.86}(HO_{1/2})_{0.05}$ |

TABLE 2

| branched organo-polysiloxane | phenyl content (mole %) | hydroxyl content (weight %) | weight-average molecular weight | softening point (° C.) |
| --- | --- | --- | --- | --- |
| SR1 | 70 | 6.0 | 2300 | 60–100 |
| SR2 | 0 | 0 | 1500 | <25 |
| SR3 | 0 | 0 | 1300 | <25 |
| SR4 | 0 | 1.2 | 16000 | 40–60 |

EXAMPLES 1 TO 4 AND COMPARATIVE EXAMPLES 1 TO 4

Flame-retardant polyolefin-type resin compositions were prepared by mixing the components described in the proportions reported in Tables 3 and 5. The polyolefin-type resins used were high-density polyethylene (Hizex 5303E from Mitsui Kagaku Kabushiki Kaisha), ethylene-ethyl acrylate copolymer (Jaylex EEA A1150 from Japan Polyolefin, abbreviated as EEA resin), and maleic anhydride-modified polyethylene. The hydrated metal compound powder used was magnesium hydroxide powder (Kisuma 5A from Kyowa Kagaku Kabushiki Kaisha). The SR1 to SR4 reported in Table 1 were used as the branched organopolysiloxane. The mixing procedure is described below.

The polyolefin-type resin was introduced into the mixer (a Labo-Plast Mill from Toyo Seiki Seisakusho) and melted by heating to 180 to 220° C. The magnesium hydroxide powder was then introduced with mixing. The branched organopolysiloxane was subsequently introduced with mixing to yield the flame-retardant polyolefin-type resin composition. The resulting flame-retardant polyolefin-type resin composition was injection molded at 180 to 220° C. The properties (oxygen index and tensile strength) of the resulting molding were measured; these results are reported below in Tables 3 and 5.

EXAMPLE 5

A polyolefin-type resin composition was prepared by intermixing the high-density polyethylene and magnesium hydroxide powder described in Example 1 and the branched organopolysiloxane SR1 to homogeneity in the proportions reported in Table 4. The mixing procedure was as follows: the high-density polyethylene was introduced into the mixer (a Labo-Plast Mill from Toyo Seiki Seisakusho) and melted by heating to 180 to 220° C.; the magnesium hydroxide powder was then introduced with mixing; the branched organopolysiloxane SR1 was subsequently introduced with mixing to yield the flame-retardant polyolefin-type resin composition. The resulting flame-retardant polyolefin-type resin composition was injection molded at 180 to 220° C. The oxygen index of the resulting molding was measured and the results are reported below in Table 4.

EXAMPLE 6

A power cable was fabricated by coating an electric wire with the flame-retardant polyolefin-type resin composition prepared in Example 1. The wire (conductor cross section=8 mm$^2$) comprised a core wire coated with crosslinked polyethylene insulation (coating thickness=1 mm). The power cable was fabricated by coating this wire with a 1.8 mm thickness of the flame-retardant polyolefin-type resin composition of Example 1. An excellent appearance was presented by the power cable coated with the flame-retardant polyolefin-type resin composition. The flame retardancy of this power cable met the requirements of the test when evaluated by the VW1 flame test of UL Standard 758.

COMPARATIVE EXAMPLE 5

Power cable coated with a flame-retardant polyolefin-type resin composition was fabricated according to the procedures of Example 6, but in this case using the polyolefin-type resin composition prepared in Comparative Example 1 rather than the polyolefin-type resin composition that was used in Example 6. The resulting power cable had a good appearance, but did not meet the requirements of the test when subsequently evaluated by the VW-1 flame test of UL Standard 758.

TABLE 3

| | Example 1 | Example 2 | Example 3 | Example 4 |
| --- | --- | --- | --- | --- |
| components | | | | |
| high-density polyethylene (parts) | 100 | 100 | | 90 |
| EEA resin (parts) | | | 100 | |
| maleic anhydride-modified polyethylene (parts) | | | | 10 |
| magnesium hydroxide (parts) | 100 | 50 | 100 | 100 |
| branched organopolysiloxane (parts) | | | | |
| SR1 | 10 | 10 | 10 | 10 |
| properties | | | | |
| oxygen index | 34 | 29 | 34 | 37 |
| tensile strength (MPa) | 0.17 | — | — | — |

TABLE 4

|  | Example 5 |
|---|---|
| components | |
| high-density polyethylene (parts) | 100 |
| EEA resin (parts) | |
| magnesium hydroxide (parts) | 100 |
| branched organopolysiloxane (parts) | |
| SR1 | 10 |
| properties | |
| oxygen index | 30 |

TABLE 5

|  | Comparative Example 1 | Comparative Example 2 | Comparative Example 3 | Comparative Example 4 |
|---|---|---|---|---|
| components | | | | |
| high-density polyethylene parts | 100 | 100 | 100 | 100 |
| magnesium hydroxide (parts) | 100 | 100 | 100 | 100 |
| branched organo-polysiloxane (parts) | | | | |
| SR2 | | 10 | | |
| SR3 | | | 10 | |
| SR4 | | | | 10 |
| properties | | | | |
| oxygen index | 27 | 27 | 27 | 27 |
| tensile strength (mPa) | 0.18 | — | — | — | polyolefin-type resin composition, a method for producing same, and flame-retardant cables.

We claim:

1. A flame-retardant polyolefin-type resin composition comprising
   (A) 100 weight parts polyolefin-type resin,
   (B) 30 to 200 weight parts powder of a hydrated metal compound, and
   (C) 0.01 to 50 weight parts branched organopolysiloxane with average unit formula $R_aSiO_{(4-a)/2}$ where each R is a selected from the group consisting of monovalent organic groups selected from the group consisting of $C_1$ to $C_{12}$ alkyl and $C_6$ to $C_{12}$ aryl and hydroxyl, wherein aryl constitutes from 50 to 100 mole % of the total monovalent organic groups and the hydroxyl content in each molecule is from 1 to 10 weight % and a is a number from 0.75 to 2.5 and the organopolysiloxane contains at least one $RSiO_{3/2}$ siloxane unit in each molecule, where R is as previously described.

2. The flame-retardant polyolefin-type resin composition of claim 1, in which component (C) is branched organopolysiloxane with average molecular formula $(R_3SiO_{1/2})_a(R_2SiO_{2/2})_b(RSiO_{3/2})_c(SiO_{4/2})_d(HO_{1/2})_e$ where R is a monovalent organic group selected from the group consisting of $C_1$ to $C_{12}$ alkyl and $C_6$ to $C_{12}$ aryl, aryl constitutes from 50 to 100 mole % of the total monovalent organic groups, the hydroxyl content in each molecule is from 1 to 10 weight %, a is zero or a positive number, b is zero or a positive number, c is a positive number, d is 0 or a positive number, and e is a positive number.

3. The flame-retardant polyolefin-type resin composition according to claim 1 in which the monovalent organic groups of component (C) are selected from the group consisting of propyl and aryl.

4. The flame-retardant polyolefin-type resin composition according to claim 1 in which component (C) has a weight-average molecular weight of from 300 to 10,000.

5. The flame-retardant polyolefin-type resin composition according to claim 1 in which component (C) is solid at room temperature.

6. The flame-retardant polyolefin-type resin composition according to claim 1 in which component (B) is selected from the group consisting of magnesium hydroxide powder and aluminum hydroxide powder.

7. The flame-retardant polyolefin-type resin composition according to claim 1, where component (A) is selected from the group consisting of polyethylenes, ethylene-vinyl acetate copolymers, ethylene-ethyl acrylate copolymers, and copolymers of maleic acid or maleic anhydride with ethylene or α-olefin.

8. The flame-retardant polyolefin-type resin composition according to claim 1, where component (B) has an average particle size in the range of from 0.05 to 10 μm.

9. The flame-retardant polyolefin-type resin composition according to claim 1, where aryl constitutes 60 to 90 mole % of the total monovalent organic groups in component (C).

10. The flame-retardant polyolefin-type resin composition according to claim 1, where each molecule of component (C) contains from 2 to 8 weight % hydroxyl.

11. The flame-retardant polyolefin-type resin composition according to claim 1 comprising from 0.1 to 30 weight parts component (C) per 100 weight parts of component (A).

12. A an article of manufacture having applied thereon a flame-retardant polyolefin-type resin composition comprising
   (A) 100 weight parts polyolefin-type resin,
   (B) 30 to 200 weight parts powder of a hydrated metal compound, and
   (C) 0.01 to 50 weight parts branched organopolysiloxane with average unit formula $R_aSiO_{(4-a)/2}$ where each R is a selected from the group consisting of monovalent organic groups selected from the group consisting of $C_1$ to $C_{12}$ alkyl and $C_6$ to $C_{12}$ aryl and hydroxyl, wherein aryl constitutes from 50 to 100 mole % of the total monovalent organic groups and the hydroxyl content in each molecule is from 1 to 10 weight % and a is a number from 0.75 to 2.5 and the organopolysiloxane contains at least one $RSiO_{3/2}$ siloxane unit in each molecule, where R is as previously described.

13. The article of manufacture according to claim 12 in which component (C) is branched organopolysiloxane with average molecular formula $(R_3SiO_{1/2})_a(R_2SiO_{2/2})_b(RSiO_{3/2})_c(SiO_{4/2})_d(HO_{1/2})_e$ where R is a monovalent organic group selected from the group consisting of $C_1$ to $C_{12}$ alkyl and $C_6$ to $C_{12}$ aryl, aryl constitutes from 50 to 100 mole % of the total monovalent organic groups, the hydroxyl content in each molecule is from 1 to 10 weight %, a is zero or a positive number, b is zero or a positive number, c is a positive number, d is 0 or a positive number, and e is a positive number.

14. A flame-retardant cable having applied thereon a flame-retardant polyolefin-type resin composition comprising (A) 100 weight parts polyolefin-type resin, (B) 30 to 200 weight parts powder of a hydrated metal compound, and (C) 0.01 to 50 weight parts branched organopolysiloxane with average unit formula $$R_a SiO_{(4-a)/2}$$

where each R is a selected from the group consisting of monovalent organic groups selected from the group consisting of $C_1$ to $C_{12}$ alkyl and $C_6$ to $C_{12}$ aryl and hydroxyl, wherein aryl constitutes from 50 to 100 mole % of the total monovalent organic groups and the hydroxyl content in each molecule is from 1 to 10 weight % and a is a number from 0.75 to 2.5 and the organopolysiloxane contains at least one $RSiO_{3/2}$ siloxane unit in each molecule, where R is as previously described.

15. The flame-retardant cable according to claim 14 in which component (C) is branched organopolysiloxane with average molecular formula $$(R_3SiO_{1/2})_a(R_2SiO_{2/2})_b(RSiO_{3/2})_c(SiO_{4/2})_d(HO_{1/2})_e$$

where R is a monovalent organic group selected from the group consisting of $C_1$ to $C_{12}$ alkyl and $C_6$ to $C_{12}$ aryl, aryl constitutes from 50 to 100 mole % of the total monovalent organic groups, the hydroxyl content in each molecule is from 1 to 10 weight %, a is zero or a positive number, b is zero or a positive number, c is a positive number, d is 0 or a positive number, and e is a positive number.

* * * * *